Nov. 9, 1943.                    W. L. McNAMARA ET AL                    2,334,111
                         APPARATUS FOR BURNING OFF GLASSWARE
                         Filed March 31, 1941         4 Sheets-Sheet 1

INVENTORS.
William L. McNamara.
Merril O. Combs.
BY Corbett, Mahoney & Miller
ATTORNEYS.

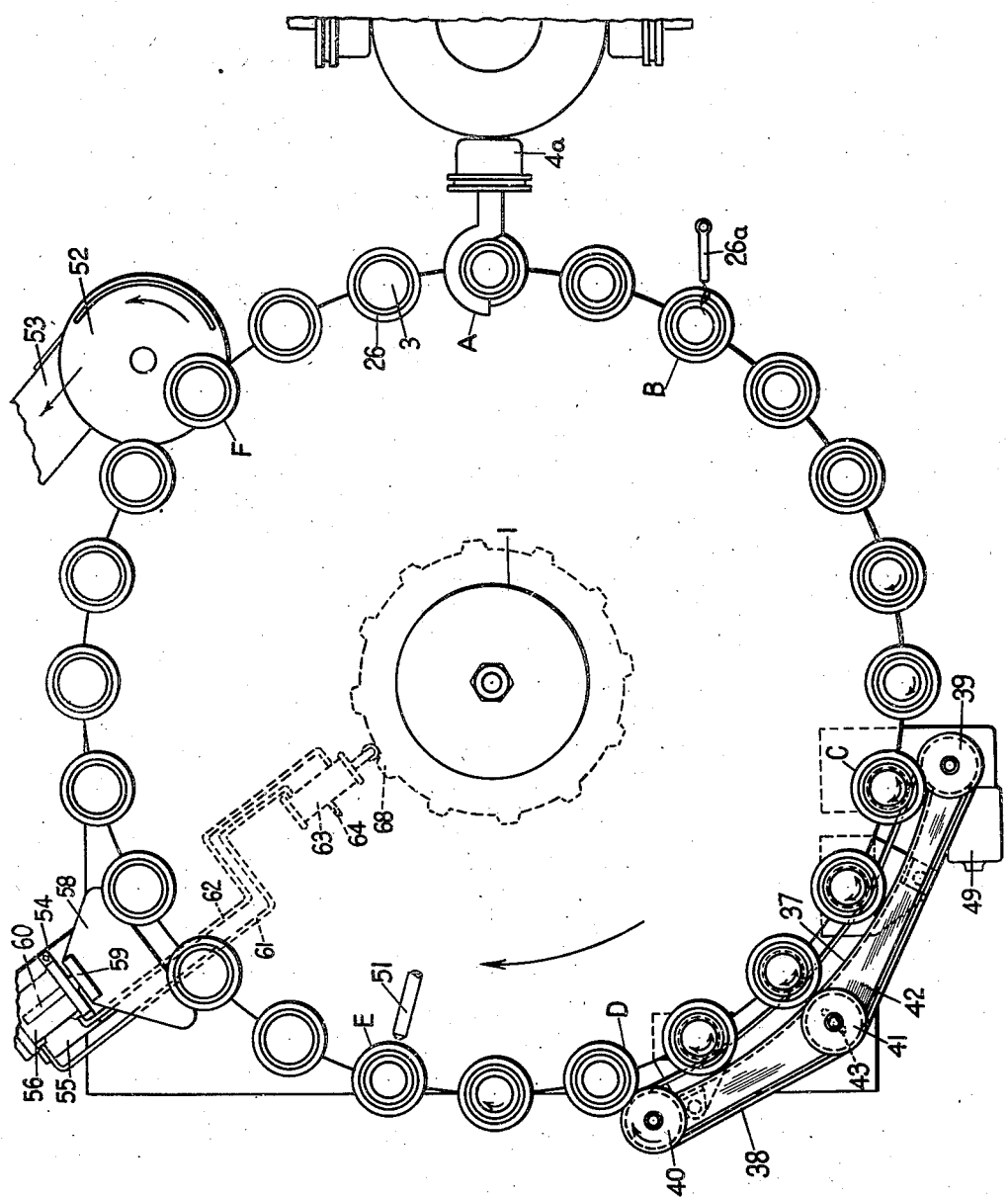

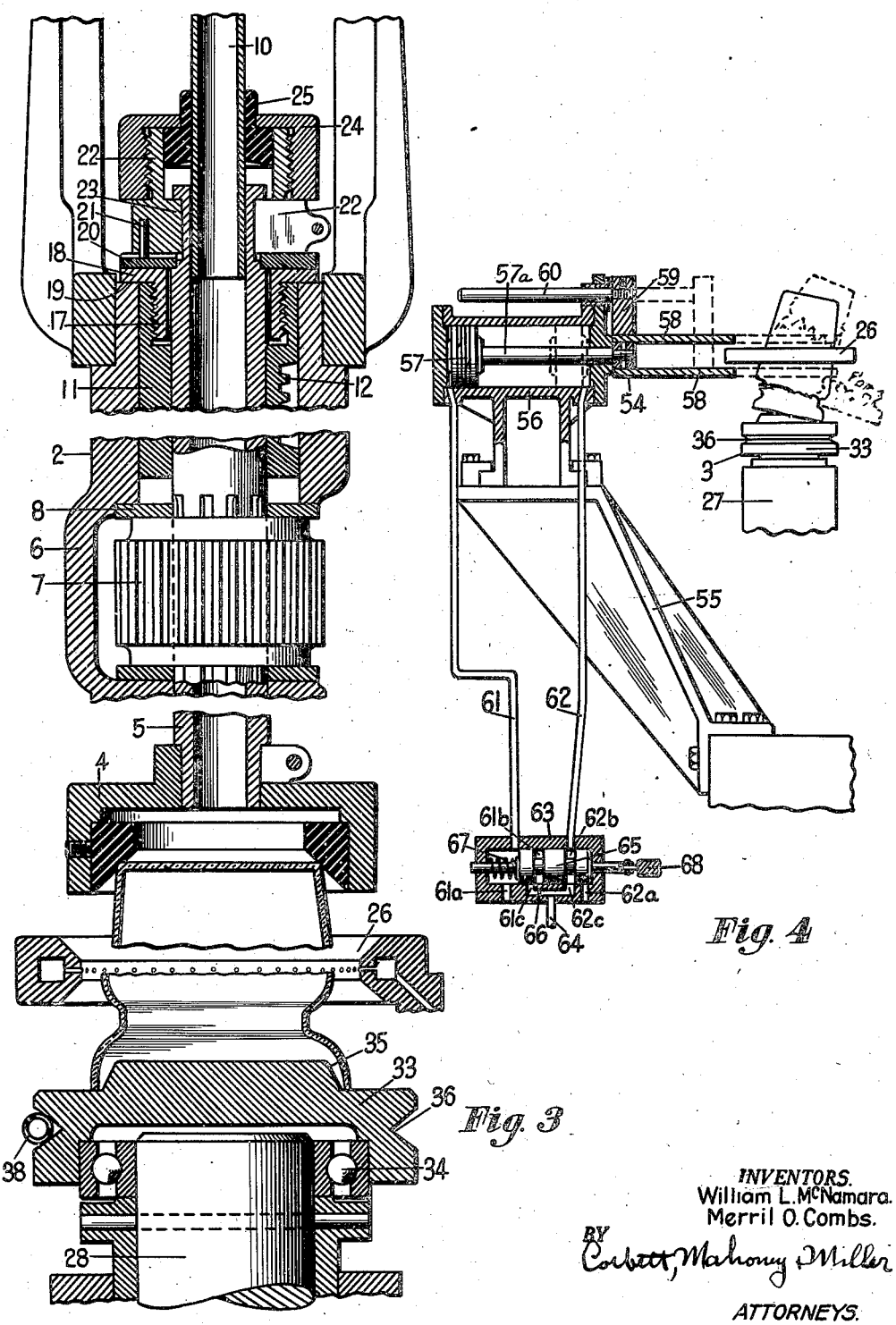

Patented Nov. 9, 1943

2,334,111

UNITED STATES PATENT OFFICE 2,334,111

APPARATUS FOR BURNING OFF GLASSWARE

William L. McNamara and Merril Otto Combs, Lancaster, Ohio, assignors to Anchor Hocking Glass Corporation, Lancaster, Ohio, a corporation of Delaware Application March 31, 1941, Serial No. 386,128

15 Claims. (Cl. 49—50)

Our invention relates to method and apparatus for burning off glassware. It has to do, more particularly, with a method and apparatus for burning off the moil from a hollow glass article, such as a tumbler, by projecting a flame against the wall of the article to sever it along a predetermined line.

At the present time, burn-off methods are commonly in use in the glass industry for removing the moil from a hollow glass article and for simultaneously producing a bead on the severed edge of the article. However, considerable difficulty has been encountered in these methods and in eliminating "teardrops" from the bead formed on the article. These teardrops are apparently formed during the severing operation as the moil parts from the article and glass stringers are formed which lap back on the severed edge of the article and produce teardrops or bumps on the bead produced on the article.

Burn-off machines used in the glass art at the present time are also possessed of certain disadvantages. These prior art machines have not been provided with simple and effective means for positioning the article relative to the burner which severs the moil therefrom. It is necessary that the article be held in an exact predetermined position relative to the burner so that the severance will take place along a predetermined line. With prior art machines, this was difficult to obtain and it was difficult to adjust the machine to overcome wear which would change the position of the article relative to the burner. It is customary with prior art burn-off machines to support the article by means of a vacuum chuck. It sometimes happens that the article will be dislodged from the chuck and will not be removed from the machine at the proper time. This sometimes results in injury to parts of the machine by the article which remains on the machine and which interferes with or jams parts of the machine.

One of the objects of our invention is to provide a method and apparatus for burning off the moil from a hollow glass article and for simultaneously producing a bead on the severed edge of the article, the method and apparatus being of such a nature that "teardrops" will be eliminated from the bead formed on the article.

Another object of our invention is to provide a burn-off machine which has spindles for rotatably supporting articles in a predetermined position relative to severing burners, the spindle being readily adjustable to initially position the article relative to the burner and to maintain such position in spite of wear caused by continued use of the machine.

Another object of our invention is to provide a burn-off machine wherein the article may be supported by vacuum chucks and which is provided with effective means for crushing and removing any articles dislodged from the chucks and not removed in the usual manner by the machine.

Various other objects will be apparent.

According to our method, the articles to be severed are placed on a burn-off machine and are rotated in inverted position and in a predetermined direction within suitable severing burners. When the glass at the point of severance becomes molten, the article is raised relative to the burner to stretch the molten glass. At the time the glass becomes sufficiently molten and the article starts to rise, the moil, or portion of the article below the line of severance, is subjected to a force which tends to rotate it in a direction opposite to the initial direction of rotation of the article. In other words, there will be a force tending to rotate the lower part of the article in a direction opposite to the direction of rotation of the upper part of the article. This produces a twisting action as the severance of the article continues. Simultaneously, the upper part of the article continues to rise. After being subjected to this twisting action and to the stretching action caused by the rising of the upper part of the article, the glass will finally be severed along a predetermined line. We have found under actual production conditions, that a very desirable bead will be produced on the lower severed edge of the article and this bead will be free of teardrops or bumps.

The preferred embodiment of our invention is illustrated in the accompanying drawings wherein similar characters of reference designate corresponding parts and wherein:

Figure 2 is a diagrammatic plan view of the machine.

Figure 3 is a vertical sectional view through an article-supporting spindle of the machine.

Figure 4 is a view partly in elevation and partly in vertical section of the means for crushing or removing an article dropped by a chuck.

Figure 1:
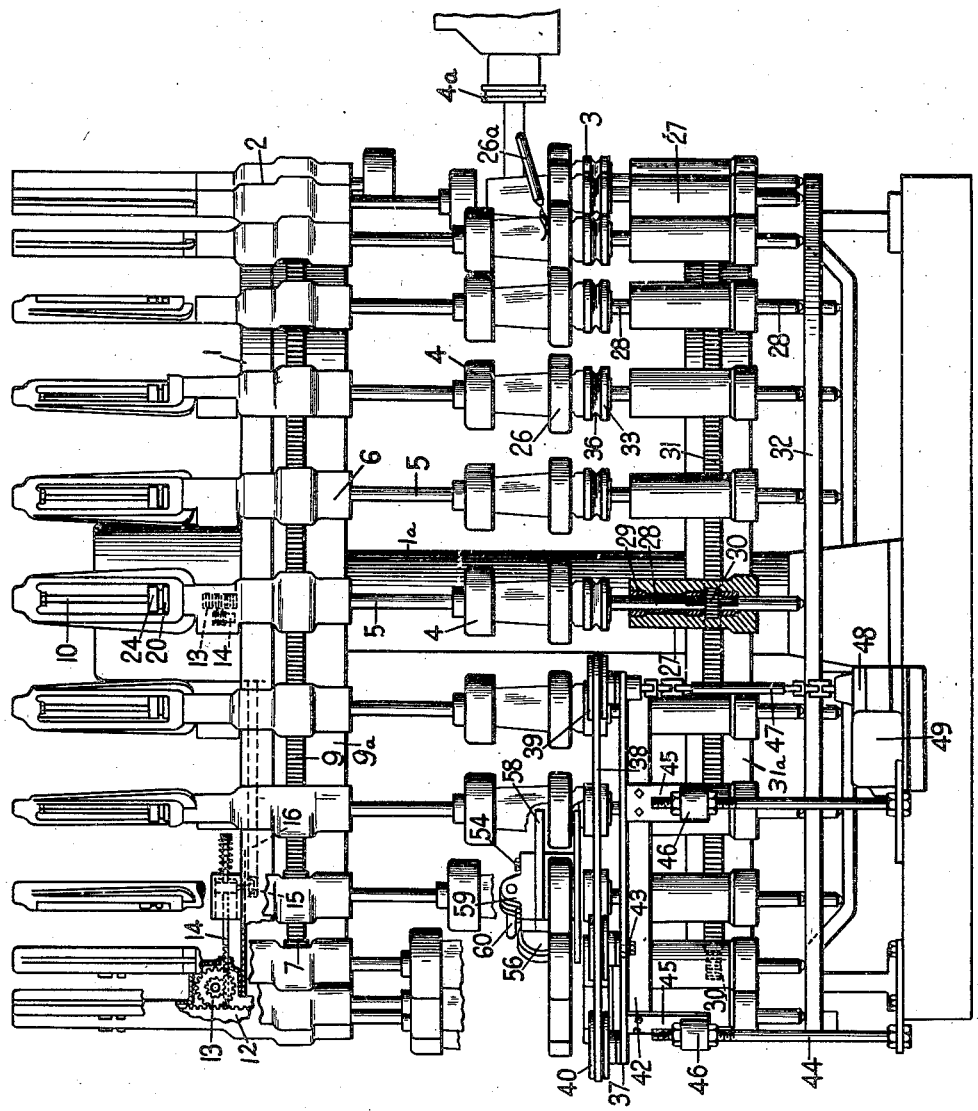
Figure 1 is a side elevational view of a machine embodying our invention.

With reference to the drawings, we have illustrated in Figures 1 and 2 a burn-off machine which is of the rotary or turret type. In its general construction, this machine is of the type employed in the prior art. However, we have made a number of important improvements in this machine.

The machine consists of a rotatable turret 1 which rotates on a stationary column 1a and carries on its upper portion a plurality of circumferentially spaced vertically reciprocable spindle units 2. On its lower portion, the machine carries a plurality of similarly spaced vertically reciprocable moil-supporting means 3. The articles may be loaded on the machine by means of a transfer device 4a which may be of the type disclosed in the patent to McNamara, No. 1,947,610, of February 20, 1934. The articles are placed on the moil-supporting means 3 and are then engaged by vacuum chucks 4 carried on the lower ends of the spindle units 2. The articles are held in the manner indicated in Figure 1 with the moil lowermost.

Each spindle unit 2 consists of a spindle 5 which carries the chuck 4 on its lower end. The spindle 5 is rotatably and reciprocally mounted in a housing 6. Spindle 5 carries a gear 7 which is splined thereon and which is held from vertical movement by means of stop collars 8 carried by the housing 6 above and below a slot in the wall of the housing through which the gear 7 projects. Each of the gears 7 meshes with a large annular gear 9 (Figure 1) carried by a suitable stationary support 9a which is carried by column 1a. The spindle is hollow and is connected by a tube 10, which slidingly fits within the upper end thereof, to a suitable source of vacuum for the chuck 4. The upper portion of the spindle is rotatably disposed in a bearing sleeve 11. This sleeve is mounted for vertical sliding movement within the housing 6. It has a rack portion 12 formed on one side thereof. This rack portion is engaged by a pinion 13 (Figure 1) which projects through a slot in the wall of the housing. The gear 13 is rotatably carried by the housing. It is rotated at the proper time by means of a rack bar 14 which is mounted in horizontal position for reciprocation on the turret 1. The rack bar is provided with a roller 15 supported on a depending shaft. The roller 15 operates in a cam groove 16 formed in a cam member which is attached to stationary support 9a. The cam groove is so shaped that as the turret rotates, the rod 14 will be reciprocated and, consequently, the member 11 will be raised or lowered. This will raise or lower spindle 5 in a manner which will be apparent hereinafter.

The sleeve 11 has a smaller sleeve 17 threaded into the upper end thereof. This sleeve has a horizontal flange 18 on its upper end which bears against a shoulder portion 19 of housing 6 when the spindle 5 is in its lowermost position. The flange 18 and shoulder 19 serve as a stop structure for limiting the lowermost position of the spindle. A horizontally disposed hardened bearing bushing 20 is disposed above flange 18. A split collar 22 is disposed above bushing 20 in surrounding relationship to spindle 5 and is provided with an enlarged portion 23 which projects into an annular groove formed in the upper end of the spindle. The collar 22 grips spindle 5 and will rotate therewith. Collar 22 is provided with a plurality of pins 21 which depend therefrom and extend into keyways formed in member 20. Thus, member 20 will rotate with the spindle and relative to member 17 upon which it rests. A cap member 24 is threaded on the upper end of collar 22 and holds a rubber packing member 25 in position. This member 25 surrounds the tube 10 and is provided with a portion which is wedged between tube 10 and collar 22 as long as cap 24 is in position.

Rotation of gear 7 will cause rotation of the spindle 5 within bearing sleeve 11. The spindle 5 will, in effect, be suspended from collar 22 which is clamped to the spindle. The bushing 20 will rotate with spindle 5 and relative to the member 17 but since member 20 is hardened, wear will not be very great. When the spindle 5 is vertically reciprocated, it will slide within the member 11. Flange 18 will limit its lowermost position. In initially adjusting the machine to properly position the vacuum chuck 4 so that it will hold the article at the proper level relative to the severing burner, the sleeve 17 may be adjusted in the sleeve 11 to position flange 18 at the proper level so that when it contacts with the shoulder 19, the article will be at the proper level. If in adjusting sleeve 17 within sleeve 11, the flange 18 is spaced above the upper end of sleeve 11, a shim may be disposed between these members. During continued use of the machine, wear at various points of the spindle unit may occur. For example, the article-engaging part of the vacuum chuck or member 20 might wear. To take up this wear, it is merely necessary to thread the sleeve 17 out of the upper end of sleeve 11. This will raise the spindle 5 within member 11. However, the final lower position of the chuck 4 will be governed by flange 18 which is also moved upwardly relative to stop 19.

Below each of the spindle units 2 on the turret 1 is carried a ring burner 26. This burner may be of the usual type and may be controlled in any suitable manner during rotation of the turret. A pilot burner 26a is shown in Figure 2 for lighting each of the burners 26 as it passes the pilot burner. When the articles are transferred to the moil-supporting means 3 and cooperating spindle unit 2 by unit 4a, each article is positioned within the cooperating burner 26. As previously explained, the article will be accurately positioned in the burner 26 by contact of member 18 with shoulder 19. The article will be so positioned in the burner that the burner flame will strike it along a predetermined annular line to produce the severance along such line. The position of the article in the burner may be accurately adjusted, as previously explained, even after continued use of the machine causes wear at the contacting surfaces of members 20 and 17. Since the spindle is suspended from the contacting members 20 and 17, this is the only point of wear which will have any effect on the position of the article within the burner.

Each of the moil-supporting units 3 consists of a tubular housing 27 (Figure 1) carried by turret 1. The housing 27 has a spindle 28 mounted therein for vertical reciprocation and rotation in bearings 29. A pinion 30 is splined on the spindle 28 and is disposed within the housing 27 in a fixed vertical position. It projects through a slot in one wall of the housing 27 and meshes with an annular gear 31 carried by a suitable stationary support 31a supported by the column 1a. The lower end of spindle 28 engages an annular stationary cam track 32 supported by the base of the machine. When the turret rotates the cam track 32 will cause proper vertical movement of the spindles 28. The upper end of each of the spindles 28 (Figure 3) carries a moil-supporting disk 33. This disk is mounted on spindle 28 for relative rotation by means of a ball bearing unit 34. The upper surface of the disk 33 is provided with a raised centrally disposed centering portion 35. The periphery of the disk 33 is provided with a continuous groove 36 which is V-shaped in cross-section. This groove is provided for a purpose to be explained. At the time the articles are positioned within the burners 26, the spindles 28 of units 3 will be in raised position, by means of cam 32, and the lower end or moil end of the articles will rest on the disks 33 as shown in Figure 3.

Figure 5:
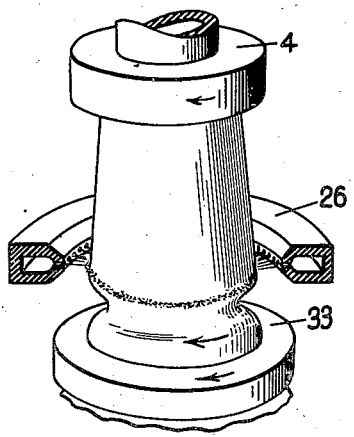
Figure 5 is a diagrammatic view showing the article being subjected to a severing burner.

The articles are placed on the units 3 of the machine, for example, at the station A (Figure 2). Each of the spindle units 2 is lowered into engagement with the article at about the station B. Each article is, therefore, supported between chuck 4 and disk 33. The spindle 28 and the spindle 5 will be rotated in the same direction and will, consequently, rotate the article as the turret revolves. During this rotation, as indicated in Figure 5, the article is subjected to the burn-off flame, produced by burner 26, which will melt the article along a predetermined annular line.

As previously stated, we provide means for preventing the formation of teardrops on the bead produced during the burn-off process. This means starts to function at about the station C at which time the glass of the article will be substantially molten at the line of severance. This means is illustrated in Figures 1, 2, 3 and 11.

The unit which we provide for this purpose is indicated generally by the numeral 37. It includes means for engaging the disks 33 as they successively come to the station B and for reversing the direction of rotation of said disks. The unit 37 comprises an endless belt 38 which is preferably in the form of a closely wound spring so that it can be stretched. This endless belt 38 passes around a drive pulley 39 at one end and an idler pulley 40 at the other end. The outer strand of the belt passes around an idler slack take-up pulley 41. The pulley 41 is carried by a support 42 by means of a bolt-and-slot adjustment 43. The support 42 also carries the pulleys 39 and 40 and is disposed substantially tangential with the turret 1. The support 42 is carried on posts 44 (Figure 1) by means of brackets 45 which are vertically adjustable on the upper end of the posts, as indicated at 46. Thus, the height of the entire unit 37 may be varied. The pulley 39 is driven by a telescoping shaft 47. The shaft 47 has its lower end connected to a speed-reducing gear unit 48 which is driven by a variable speed electric motor 49.

The pulleys 39 and 40 are so positioned relative to the turret 1 that a straight line passing through the axes of these pulleys would be disposed substantially chordal to the turret 1. In other words, the inner strand of the belt 38 will have a tendency to move inwardly beyond the periphery of the turret. Consequently, as the turret rotates and the disks 33 are brought successively to the station C, the disks which are at the same level as the belt 38 will be engaged by the belt. The belt will enter the groove 36 in each of the disks 33, as indicated best in Figures 3 and 11. The belt is driven in the direction indicated by the arrows in Figure 2. Consequently, this will rotate the disks 33 in a direction opposite to that in which the disks are rotated by the spindles 28. Reversing of the rotation of disks 33 will be permitted because of the roller bearings 34. The disks 33 successively engaging inner strand of the belt 38 at the station C will merely flex the strand of the belt outwardly, as shown in Figure 2. Thus, the disks will firmly engage the belt and will be positively rotated. They will be rotated by the belt until they pass the station D.

Figure 6:
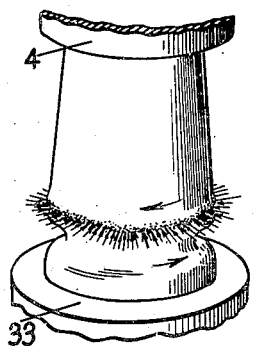
Figure 6 is a similar view but showing diagrammatically how the twisting and stretching of the article adjacent the line of severance is started.
Figure 7:
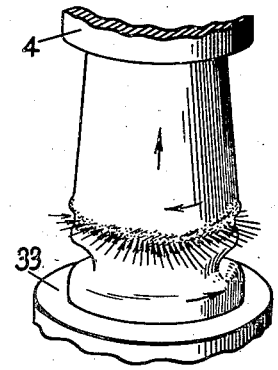
Figure 7 is a similar view but showing the article after the twisting and stretching has continued to a substantial extent.
Figure 8:
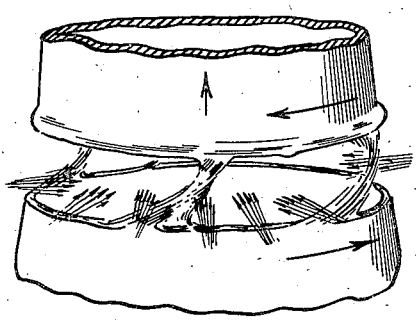
Figure 8 is a similar view but showing the article after it has been almost completely severed and the bead has started to form.
Figure 9:
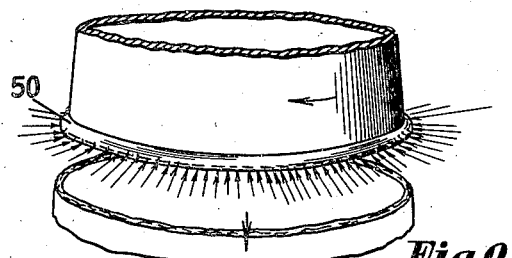
Figure 9 is a similar view but showing the article completely severed and the bead substantially completed.
Figure 10:
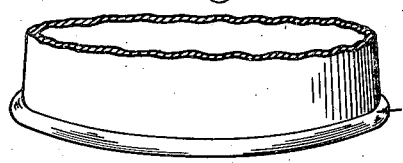
Figure 10 is a view showing the bead formed on the lower severed edge of the article.
Figure 11:
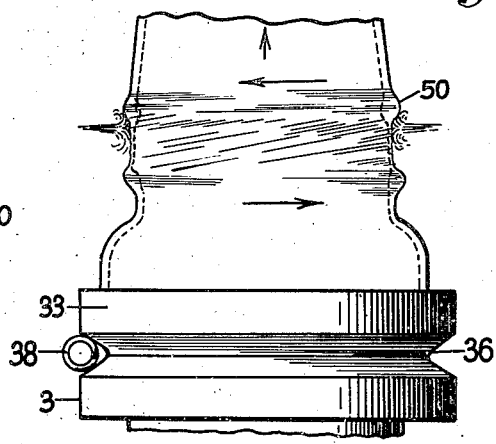
Figure 11 is a view showing the support for the lower end of the article and illustrating how it may be rotated in a direction opposite to the initial direction of rotation of the article.

As previously stated, when the articles reach the station C, the glass is substantially molten at the line of severance. At the station C, reversing the direction of rotation of the disks 33 will produce a twisting action on the glass article, as shown in Figure 6, because the upper and lower portions of the article are rotated in different directions. Also, at the station C, the units 2 start to move upwardly gradually. This will produce an upward stretching of the molten glass, adjacent the line of severance, as indicated in Figure 6. Thus, a twisting action and a stretching action is produced on the molten glass adjacent the line of severance. The stretching action and the twisting action continues, as indicated in Figures 7 and 8, until the two portions of the article part, which will be substantially at the station D. At this time, as shown in Figure 9, the bead 50 will be formed on the article. Due to the twisting action, which occurs simultaneously with the stretching, teardrops will be eliminated from the bead. As the article passes beyond the station D, the units 2 continue to raise them until they are completely out of the burners 26. At the same time, the spindles 28 drop, withdrawing the severed moils to a point below the burners 26. At station E, an air jet 51 may be provided for blowing the moils off the disk 33. After the burners pass station D, the fuel supply to them is interrupted by suitable means.

The turret will continue to carry the articles until they successively reach the take-out station F. At this station, the vacuum supply to the chucks 4 is interrupted and the articles are deposited on a rotating table 52 and then onto a conveyer 53. The associated table and conveyer may be similar to that shown in Patent No. 1,947,610 previously mentioned.

It sometimes happens that an article, after being subjected to the twisting action, will drop from the chuck 4. Although this happens infrequently with this machine, it is very important to remove such article before it contacts with the table 52 or other parts of the machine and jams or injures the machine. Also, it is important to remove a moil if air jet 51 fails to remove it. An article dropped by the chuck will be supported by the disk 33. To crush or remove this article or moil I provide a unit 54 located between the stations E and F. This unit is illustrated best in Figures 2 and 4. It comprises a supporting member 55 which supports a cylinder 56 adjacent the periphery of the turret. This cylinder 56 has a piston 57 operating therein which carries a rod 57a. The rod 57a carries on its outer end a shoe 58. This shoe 58 is provided with an upstanding portion 59 which carries a guide rod 60 that reciprocates in a suitable bearing on the cylinder 56. As shown in Figure 2, the outer end of the shoe is sufficiently wide to extend beyond two of the adjacent disks 33. If two adjacent disks both carry articles dropped by the cooperating chucks or moils not removed by jet 51, they will both be removed at once. However, the reason for making this shoe of this width is to render unnecessary the operation of unit 54 each time a disk 33 passes by it. One operation will clear two disks. As shown in Figure 4, when the piston 57 moves the shoe 58 inwardly towards the center of the turret, if an article or moil is in position on disks 33, it will be knocked off the disk or will be crushed.

An air line 61 is connected to one end of cylinder 56 and an air line 62 is connected to the other end thereof. These lines are connected to a poppet valve 63. The valve 63 is provided with a main air inlet 64 and exhaust outlets 61a and 62a. A piston 65 is disposed within the valve housing and is provided with spaced annular grooves 61b and 62b. The line 64 connects with passageway 66 which has outlets 61c and 62c. The piston 65 is normally held in the position indicated in Figure 4 by a spring 67. In this position air will flow from line 64 through passageway 66, outlet 62c, groove 62b, line 62, into cylinder 56 and force piston 57 to the left (Figure 4). Air in the opposite end of the cylinder 56 will exhaust through line 61, valve 63 and out through the exhaust port 61a. When the piston 65 is moved to the left against the force of spring 67, air will flow from line 64, through passageway 66, through outlet 61c, through groove 61b, line 61, into the end of cylinder 56. This will force piston 57 to the right. Air in the opposite end of cylinder 56 will exhaust through line 62, the housing of valve 63 and out through the exhaust opening 62a.

The piston 65 is forced to the left at the proper intervals by means of a plurality of cams 68, shown in Figures 2 and 4, which are carried at circumferentially spaced points on the central portion of the turret and rotate with the turret. It will be necessary to provide one-half the number of cams as the units 2 or 3. The valve 63 is mounted on a suitable fixed support and does not rotate with the turret.

Figure 12:
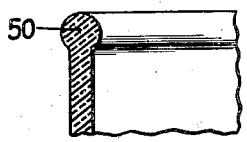
Figure 12 is a view showing the upper edge of a tumbler or other article with the finished bead.

It will be apparent from the above description that we have provided a method and apparatus for burning off glassware which has a number of advantageous features. With our method, by subjecting the article to the twisting and stretching action, when the glass becomes molten at the line of severance, teardrops are eliminated from the finished bead which is shown in Figure 12.

An important feature of the apparatus which we provide, is the spindle structure for supporting the vacuum chuck and which is illustrated best in Figure 3. With this structure the article may be accurately positioned relative to the burner. Furthermore, adjustments to compensate for wear may be readily made and still accurately position the article relative to the burner.

Another important feature of our apparatus resides in the fact that we have provided means for removing the article from the machine in case it drops from the vacuum chuck and for removing the moil in case the air jet 51 fails to remove it.

Various other advantages will be apparent from the preceding description, the drawings and the following claims.

Having thus described our invention, what we claim is:

1. A burn-off machine for burning off the moil from a glass article comprising a rotating turret, a plurality of chucks disposed at circumferentially spaced intervals on said turret for suspending articles with the moil downward, a plurality of burners associated with said chucks, means for moving the chucks vertically to properly position the articles within the burners, a plurality of moil supports disposed below the burners for supporting the moil ends of the articles, means for rotating said chucks during the rotary movement of the turret, means for rotating said moil supports in the same direction during rotation of the turret, and means for engaging the moil supports at a predetermined point during rotation of the turret for reversing the direction of rotation of said moil supports.

2. A burn-off machine according to claim 1 wherein the means for reversing the direction of rotation of said moil supports comprises a positively driven flexible belt disposed substantially parallel to the line of movement of said supports.

3. In a burn-off machine, a plurality of spindle units for suspending articles therefrom, burners associated with said spindle units for subjecting the articles to a severing flame, each of said spindle units comprising a spindle, a sleeve for supporting said spindle, said sleeve being mounted in a housing for vertical reciprocation and carrying an adjustable stop which cooperates with a portion of said housing to limit the lowermost position of said spindle, means for suspending the spindle from said sleeve, said means contacting with said adjustable stop.

4. A structure according to claim 3 wherein the stop comprises a flanged collar threaded into the upper end of said sleeve and wherein the spindle has a bushing keyed thereto which rests on said flanged collar.

5. A burn-off machine for burning off the moil from a glass article comprising a rotating turret, a plurality of chucks disposed at circumferentially spaced intervals on said turret for suspending articles with the moil downward, a plurality of burners associated with said chucks, a plurality of moil supports disposed below the burners for supporting the moil ends of the articles, and means associated with said turret for eliminating articles which drop from the chucks onto said supports or moils which remain on said supports after severance, said means comprising a shoe member movably mounted at a predetermined point along the path of movement of said supports, and means for projecting said shoe member over said supports at timed intervals during rotation of said turret.

6. A structure according to claim 5 wherein said shoe member is reciprocably mounted and is reciprocated by a cylinder and piston unit.

7. A burn-off machine for burning off the moil from a glass article comprising a rotating turret, a plurality of chucks disposed at circumferentially spaced intervals on said turret for suspending the articles with the moil downward, a plurality of burners associated with said chucks, means for moving the chucks vertically to properly position the articles within the burners, a plurality of moil supports disposed below the burners for supporting the moil ends of the articles, means for rotating said chucks during the rotary movement of the turret, means for rotating said moil supports in the same direction during rotation of the turret, means for engaging the moil supports at a predetermined point during rotation of the turret for reversing the direction of rotation of said moil supports, a movable member associated with said turret at a selected point along the circumference thereof, and means for projecting said member over said supports at timed intervals during rotation of said turret to clear such supports.

8. A burn-off machine according to claim 7 wherein the movable member is reciprocably mounted and is reciprocated by means of a cylinder and piston unit.

9. A burn-off machine for burning off the moil from a glass article comprising a rotating turret, a set of article supports comprising a plurality of supports disposed at circumferentially spaced intervals on said turret for supporting one end of the articles, a second set of article supports comprising a plurality of supports disposed at circumferentially spaced intervals for supporting the other end of the articles, a plurality of circumferentially spaced burners associated with said supports for severing the articles intermediate their ends, means for rotating said first-named set of supports during the rotary movement of the turret, means for rotating said second-named set of supports in the same direction during rotation of the turret, and means successively engaging the article supports of one set at a predetermined point during rotation of the turret and reversing the direction of rotation of said supports.

10. A burn-off machine according to claim 9 wherein said last-named means comprises a positively driven flexible belt disposed substantially parallel to the line of movement of said supports.

11. A burn-off machine for burning off the moil from a glass article comprising a rotating turret, a plurality of chucks disposed at circumferentially spaced intervals on said turret for suspending the articles with the moil downward, a plurality of burners associated with said chucks, a plurality of moil supports disposed below the burners for supporting the moil ends of the articles, means for moving the chucks vertically to properly position the articles within the burners, a movable member associated with said turret at a selected point along the circumference thereof, and means for projecting said member over said supports to clear such supports at timed intervals during rotation of said turret.

12. A burn-off machine according to claim 11 wherein said movable member is mounted for reciprocation and is reciprocated by means of a cylinder and piston unit, and means for timing said unit in accordance with movement of the turret.

13. A burn-off machine according to claim 11 wherein said movable member comprises a shoe member mounted for reciprocation, said shoe member being of sufficient length to engage articles carried by a plurality of said supports simultaneously, and means for timing reciprocation of said shoe member in accordance with movement of said turret.

14. A burn-off machine for burning off the moil from a glass article comprising a rotating turret, a plurality of chucks disposed at circumferentially spaced intervals on said turret for suspending the articles, a plurality of article supports disposed below said chucks in alignment therewith, a plurality of burners associated with said chucks, a movable member associated with said turret at a selected point along the circumference thereof, and means for projecting said member over said supports at timed intervals during rotation of said turret to clear such supports.

15. A burn-off machine for burning off the moil from a glass article comprising a movable carrier, a plurality of chucks disposed at spaced intervals on said carrier for suspending the articles, a plurality of article supports disposed on the carrier below said chucks and in alignment therewith, a plurality of burners associated with said chucks, a movable member associated with said carrier at a selected point along the path of movement thereof, and means for projecting said member over said supports at timed intervals during movement of said carrier to clear such supports.

WILLIAM L. McNAMARA.
MERRIL OTTO COMBS.